United States Patent [19]

Woehler

[11] Patent Number: 5,100,247
[45] Date of Patent: Mar. 31, 1992

[54] WHEEL BEARING ARRANGEMENT

[75] Inventor: Hans-Juergen Woehler, Stuttgart, Fed. Rep. of Germany

[73] Assignee: Dr. Ing. h.c.F. Porsche, AG, Fed. Rep. of Germany

[21] Appl. No.: 691,428

[22] Filed: Apr. 25, 1991

[30] Foreign Application Priority Data

May 4, 1990 [DE] Fed. Rep. of Germany ....... 4014399

[51] Int. Cl.$^5$ .................. F16C 13/00; F16C 43/04
[52] U.S. Cl. .................... 384/544; 301/9 CN; 301/126; 384/542
[58] Field of Search ........... 384/449, 490, 504, 505, 384/512, 537, 542-544, 585, 586, 589; 301/65, 9 CN, 111, 114, 126, 131, 105 R

[56] References Cited

U.S. PATENT DOCUMENTS

| 2,037,982 | 4/1936 | Hughes | 301/126 |
| 2,271,849 | 2/1942 | Wallace | 301/126 |
| 3,552,813 | 1/1971 | Brescia, Jr. et al. | 384/542 |
| 4,244,631 | 1/1981 | Cadaret | 384/589 |
| 4,352,528 | 10/1982 | Guimbretiere | 384/512 |
| 4,493,388 | 1/1985 | Welschof et al. | 384/544 X |
| 4,765,688 | 8/1988 | Hofmann et al. | 384/544 X |

FOREIGN PATENT DOCUMENTS

| 2511950 | 3/1982 | France | 301/105 R |
| 299073 | 12/1971 | U.S.S.R. | 384/504 |
| 1392172 | 4/1975 | United Kingdom | 301/105 R |
| 2191267 | 12/1987 | United Kingdom | 384/512 |

Primary Examiner—Thomas R. Hannon
Attorney, Agent, or Firm—Evenson, Wands, Edwards, Lenahan & McKeown

[57] ABSTRACT

A wheel bearing for wheels of motor vehicles comprises a bearing or ball roller bearing which is connected with a wheel carrier and, in a holding manner, receives a wheel hub fastened by a clamping device. The wheel hub is axially supported on the ball bearing and extends by via a tube-shaped projection to a first bearing ball in the bearing where a clamping bolt, which is axially supported on the ball bearing, stands opposite the wheel hub. This clamping bolt, by a bearing sleeve, extends to the tube-shaped projection and receives it in a torsion-proof manner by way of a centric pin. This results in the advantages that the assembly or the clamping takes place only from the exterior side of the vehicle and, in the case of a demounting, the hub part can easily be pulled out of the ball bearing after the loosening of the nut.

7 Claims, 1 Drawing Sheet

WHEEL BEARING ARRANGEMENT

BACKGROUND AND SUMMARY OF THE INVENTION

The present invention relates to a wheel bearing arrangement and, more particularly, to a wheel bearing arrangement in which a wheel hub is axially supported on a ball bearing and, extending by way of a tube-shaped projection to a first bearing ball, is held in the ball bearing and a clamping bolt is axially supported on the ball bearing and is arranged opposite the wheel hub so as to extend via a bearing sleeve to the tube-shaped projection.

German Patent Document DE-A 21 13 723 shows a known wheel bearing arrangement for a motor vehicle wheel comprising a double-row ball bearing connected with a wheel carrier. A hollow shaft of a wheel hub extends through the ball bearing on which, at an end side on the interior side of the wheel, a connected element is fitted on and is fastened by a screw guided therethrough. In this type of bearing arrangement, an assembly with the guided-through screw requires high expenditures, and because of the considerable length of the hollow shaft, it is not a light-weight construction.

It is an object of the present invention to provide a bearing arrangement for a motor vehicle wheel which is easy to mount and results in a light-weight constructional unit while optimizing the safety.

According to the present invention, this object has been achieved by a wheel hub axially supported on the ball bearing and, extending by way of a tube-shaped projection to a first bearing ball, held in the ball bearing. A clamping bolt is axially supported on the ball bearing opposite the wheel hub and extends via a bearing sleeve to the tube-shaped projection which receives the changing bolt by way of a centric pin in a torsion-proof manner.

Principal advantages achieved by the present invention are that the assembly or the clamping-together takes place only from the direction exteriorly of the wheel. During a demounting, the hub part can easily be pulled out of the ball bearing after the loosening of the nut.

The use of a light-metal hub instead of a steel hub results in a significant weight advantage. In order to achieve an optimal bearing support, the light-metal hub is provided with a tube-shaped projection which has only such a length sized to ensure a sufficient longitudinal support as well as a wheel centering.

For establishing a positive locking for the purpose of achieving a torque support, the wheel hub and the clamping bolt have polygonal sections which extend inside one another. Preferably a pentagonal shape and a correspondingly configured receiving device in the wheel hub are used. A centering of the wheel hub takes place by the clamping bolt which, for this purpose, has a sleeve-shaped projection connected with the inner race of the bearing as well as a connecting polygonal pin which is fitted into the tube-shaped projection and receives it in a centering manner.

BRIEF DESCRIPTION OF THE DRAWINGS

These and other objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
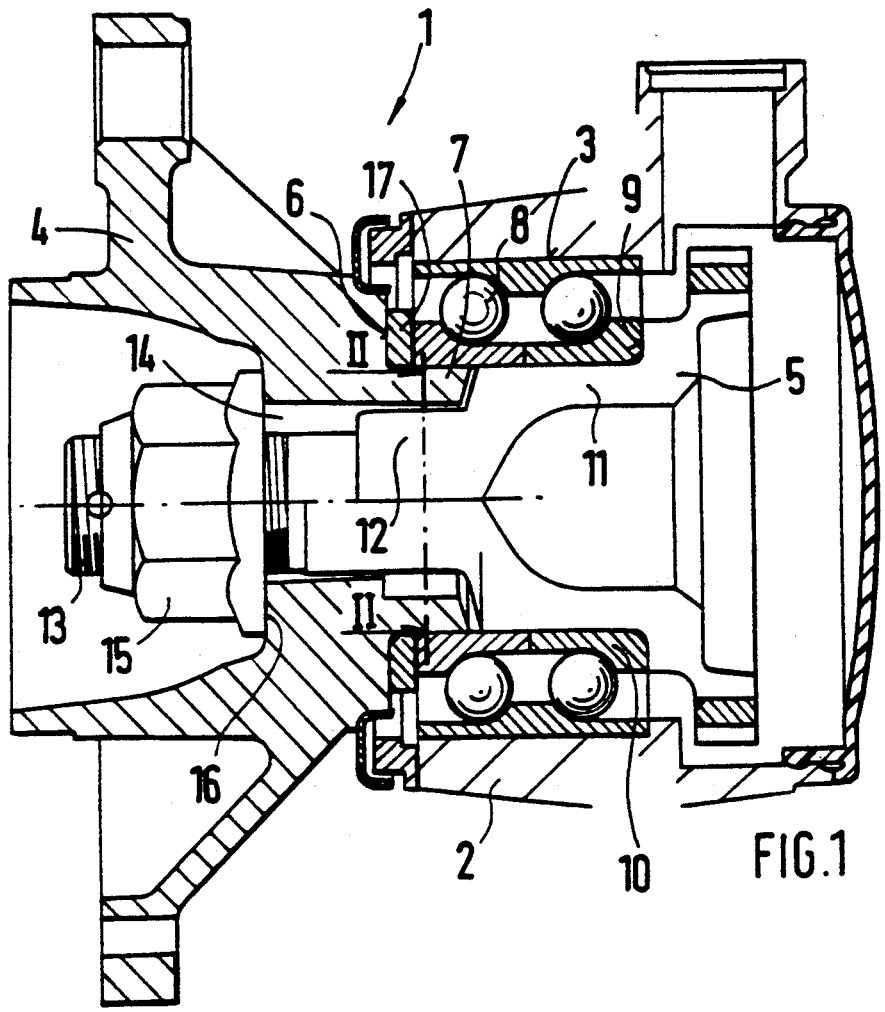
FIG. 1 is a sectional view of a wheel bearing arrangement with a light-metal wheel hub and a steel clamping bolt.
Figure 2:
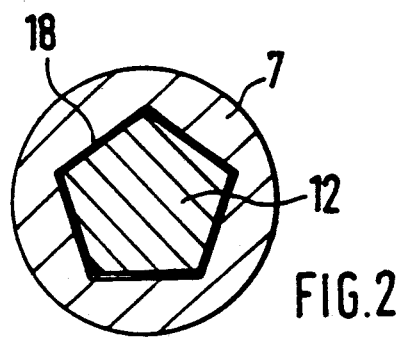
FIG. 2 is a sectional view along line II—II of FIG. 1 of a tube-shaped projection of the wheel hub and a pin of the clamping bolt.

The wheel bearing arrangement designated generally by numeral 1 for a motor vehicle wheel comprises essentially a double-row ball bearing 3 pressed into a wheel carrier 2 in which a wheel hub 4 and a clamping bolt 5 are held by a clamping device.

The wheel hub 4 has a front-side supporting surface 6 which faces the bearing 3 as well as the wheel carrier 2 and which is followed by a centrically arranged tube-shaped projection 7 which penetrates into the bearing 3 and extends, with respect to the exterior side of the wheel, to the first bearing ball 8.

The clamping bolt 5 is arranged opposite the wheel hub 4 and supports itself by its front face 9 axially on the inner race 10 of the ball bearing 3. A centric bearing sleeve 11 extends behind this front face 9, to the projection 7 of the hub 4 and changes into a centric pin 12 which projects in a centering manner into the tube-shaped projection 7.

The tube-shaped projection 7 has a receiving device 18 which extends in the axial direction of the hub 4 and is polygonal in its cross-section (in particular, a pentagonal shape). The correspondingly constructed pin 12 projects into this receiving device 18.

A threaded bolt 13 is provided behind the pin 12 of the clamping bolt 5, and extends through a bore 14 of the hub 4. The bolt 13 carries a nut 15 on the end side for clamping purposes. This nut 15 is tightened with respect to the wheel hub 4 by bracing it against a step 16 of the hub body. This results in a clamping of the wheel hub 4 on the ball bearing 3.

In order to achieve a minimal surface pressure from the hub 4 on the inner race 10 of the bearing, a steel ring 17 is preferably connected between the hub 4 and the bearing 3. The wheel hub 4 preferably consists of a light metal, and the clamping bolt 5 consists of a steel material so that the wheel bearing arrangement has a low weight.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A wheel bearing arrangement for a motor vehicle wheel on a wheel carrier, comprising a light-weight metal wheel hub, a clamping device, a double-row ball bearing with an outer race operatively connected with the wheel carrier and holdably receiving the wheel hub so as to be fastened by the clamping device, wherein the wheel hub is axially supported on the bearing arrangement and has a tube-shaped projection extending to a first ball of the double-row ball bearing so as to be held securely in the bearing, and a steel clamping bolt axially supported on the bearing opposite the wheel hub having a bearing sleeve which extends up to the tube-shaped projection and a centric pin configured to be received in the tube-shaped projection in a torsion-proof manner.

2. The wheel bearing arrangement according to claim 1, wherein the tube-shaped projection is configured with a polygonal cross-section to constitute a form-locking receiving device for the centric pin of the clamping bolt which is provided with a corresponding polygonal cross-sectional shape.

3. The wheel bearing arrangement according to claim 1, wherein the clamping bolt has a threaded bolt which extends in the direction of the exterior side of the wheel and is connectable to a nut which extends over a projection of the wheel hub so as to constitute the clamping device for fastening the wheel hub.

4. The wheel bearing arrangement according to claim 3, wherein the tube-shaped projection is configured with a polygonal cross-section to constitute a form-locking receiving device for the centric pin of the clamping bolt which is provided with a corresponding polygonal cross-sectional shape.

5. The wheel bearing arrangement according to claim 1, wherein a steel ring is arranged between a front face of the bearing arrangement and a front-side supporting surface of the wheel hub.

6. The wheel bearing arrangement according to claim 5, wherein the tube-shape projection is configured with a polygonal cross-section to constitute a form-locking receiving device for the centric pin of the clamping bolt which is provided with a corresponding polygonal cross-sectional shape.

7. The wheel bearing arrangement according to claim 6, wherein the clamping bolt has a threaded bolt which extends in the direction of the exterior side of the wheel and is connectable to a nut which extends over a projection of the wheel hub so as to constitute the clamping device for fastening the wheel hub.

* * * * *